(12) United States Patent
Florentino et al.

(10) Patent No.: US 10,317,855 B2
(45) Date of Patent: Jun. 11, 2019

(54) METHOD FOR DETECTION OF DIAGNOSING CONTROL VALVE STICTION

(71) Applicant: YOKOGAWA ELECTRIC CORPORATION, Musashino-shi, Tokyo (JP)

(72) Inventors: Angelo Basa Florentino, Singapore (SG); Prakash Mariappan, Singapore (SG)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 357 days.

(21) Appl. No.: 15/168,845

(22) Filed: May 31, 2016

(65) Prior Publication Data
US 2017/0343968 A1    Nov. 30, 2017

(51) Int. Cl.
| | | |
|---|---|---|
| G05B 23/02 | (2006.01) | |
| G05B 13/04 | (2006.01) | |
| G06F 17/18 | (2006.01) | |
| F16K 37/00 | (2006.01) | |
| F23N 1/00 | (2006.01) | |

(52) U.S. Cl.
CPC ........ *G05B 13/041* (2013.01); *F16K 37/0083* (2013.01); *G05B 23/0235* (2013.01); *G06F 17/18* (2013.01); *F16K 37/0041* (2013.01); *F16K 37/0091* (2013.01); *F23N 1/002* (2013.01); *F23N 2035/14* (2013.01)

(58) Field of Classification Search
CPC ............ F16K 37/0083; F16K 37/0091; G05B 23/0238; G05B 13/041; G01N 19/02
See application file for complete search history.

(56) References Cited

U.S. PATENT DOCUMENTS

| | | | |
|---|---|---|---|
| 7,274,995 B2 | 9/2007 | Zhan et al. | |
| 7,424,395 B2* | 9/2008 | Emigholz | C10G 11/187 |
| | | | 702/182 |
| 8,145,328 B2 | 3/2012 | Choudhury et al. | |
| 9,645,584 B2* | 5/2017 | Kucera | F23N 1/002 |
| 2005/0104020 A1* | 5/2005 | Zhan | G05B 23/024 |
| | | | 251/35 |
| 2005/0107962 A1 | 5/2005 | Zhan et al. | |
| 2007/0262741 A1* | 11/2007 | Singhal | G05B 23/0243 |
| | | | 318/611 |
| 2008/0004836 A1 | 1/2008 | Tewes et al. | |
| 2009/0222124 A1 | 9/2009 | Latwesen | |
| 2011/0295407 A1 | 12/2011 | Pyötsia et al. | |
| 2015/0032270 A1 | 1/2015 | Gattu et al. | |
| 2015/0112639 A1 | 4/2015 | Kanchi et al. | |

OTHER PUBLICATIONS

Brasio, Romanenko, Fernandes; "Detection of Stiction in Level Control Loops;" 2015; Science Direct Elsevier IFAC-PapersOnLine; 48-8; pp. 421-426.*
Communication dated Oct. 5, 2017, from European Patent Office in counterpart application No. 17152935.7.

* cited by examiner

*Primary Examiner* — Mohamed Charioui
*Assistant Examiner* — Christine Y Liao
(74) *Attorney, Agent, or Firm* — Sughrue Mion, PLLC (57) ABSTRACT

A system, method, and an apparatus relating to data collection regarding valve movement over a period of time in order to determine the effects of stiction on the valve. With data collection done over a period of time, it is possible to remove dependency on a high speed method of data collection. The evaluation of the valve movement includes consideration of a manipulated variable (MV) for diagnosis, or detection, of stiction of the valve.

14 Claims, 7 Drawing Sheets

METHOD FOR DETECTION OF DIAGNOSING CONTROL VALVE STICTION

FIELD OF THE INVENTION

Exemplary embodiments relate to diagnostics and evaluation of control elements or field devices for process control systems.

BACKGROUND

In the related art within industrial plant environments, particularly those utilizing Industrial Automation (IA), there are control systems for the monitoring and adjustment of control elements or field devices. The control elements or field devices may be used for measuring or adjusting physical properties, quantities, or characteristics of a process, such as flow rate, temperature, level, or pressure.

IA operations must optimize control of the control elements or field devices in order to maximize profitability, while at the same time maintaining safe operation. Control stabilization is key to achieving these goals, and stabilization can often be improved through closer evaluation of a plant's control loops.

Figure 1:
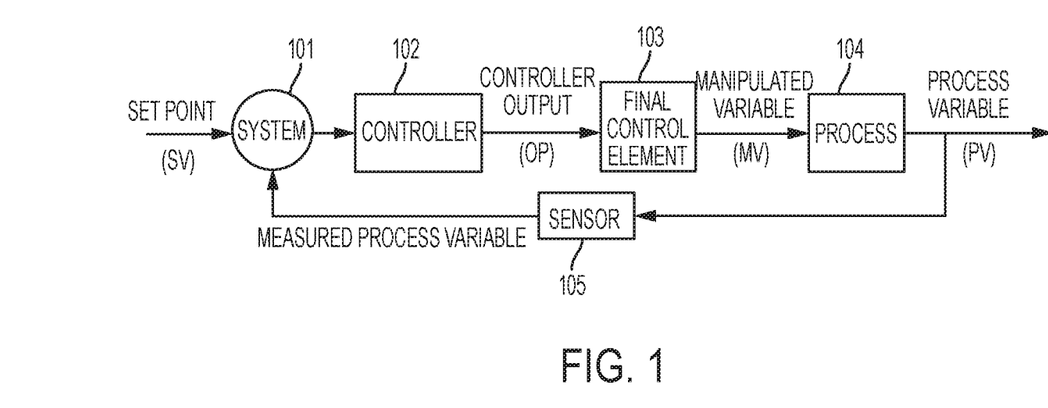
FIG. 1 illustrates a related art example of a control loop utilized in order to monitor or adjust a process.

In the related art, a control loop may be utilized in order to monitor or adjust a process. Generally, control loops are categorized into open loops, closed loops, and hybrid systems. In the related art, as shown in FIG. 1, a system (101) may attempt to adjust a process (104) through a closed loop system. The process (104) may be a parameter that needs to be controlled, such as flow, level, temperature, or pressure. The output parameter that is controlled or adjusted is called the process variable (PV). The PV is the measured state of the process. A sensor (105) measures the PV, and this measured PV is provided as feedback to the system (101) for the controller (102) to make adjustments in a closed loop system.

In the closed loop system, a set point value (SV) is the desired state of the process. A controller (102) can determine a controller output (OP) sent to a final control element (103) or field device for controlling the final control element (103) to achieve the set point value. The output of the final control element (103) is a positioner signal that is a manipulated variable (MV). Manipulated variables are input variables in process control. The manipulated variables are the input that is controlled by process operator or control system. The manipulated variables are adjusted by the process operator (or control system) to keep controlled variables in the system at constant settings or at their set-points. The manipulated variable (MV) then has an effect on the process (104). The process variable (PV) that is output by the process (104) as a result of the control system is the result.

As the process variable (PV) may not match with the desired set point value (SV), the close loop system controller (102) can compare the data to determine the difference, or error, between the measured process variable (PV) and the desired set point value (SV). Based on the difference, or error, a desired controller output (OP) can be computed to further adjust the final control element (103) in an attempt to lessen the difference between the process variable (PV) and the desired set point value (SV). The controller output (OP) controls movement in the final control element (103), such as a valve. The output of the valve, or the valve positioner signal, then adjusts the manipulated variable (MV), which, in turn, affects the process variable (PV).

In real world applications, there is an issue of stiction for final control elements. Valve stiction exists when resistance prevents movement in a control operation for a valve opening. As a result, additional force is required to move the valve. The application of the additional force causes a sudden movement in the valve.

In the related art, diagnostics related to stiction relate to consideration of one or more of the variables.

U.S. Pat. No. 8,145,328B2 (Patent Document 1) discloses detection and quantification of stiction. According to the related art, consideration of the process variable (PV), controller output (OP), and set point value are contemplated.

US20150112639A1 (Patent Document 2) discloses a method and apparatus for performing diagnostics on a conventional control valve. According to the related art, consideration of the process variable (PV) and controller output (OP) are contemplated.

U.S. Pat. No. 7,274,995B2 (Patent Document 3) discloses an apparatus and method for identifying possible defect indicators for a valve. According to the related art, consideration of the process variable (PV) and controller output (OP) are contemplated.

US20150032270A1 (Patent Document 4) discloses a spectral analysis based detector for a control valve. According to the related art, there is a method using pattern matching the frequency spectrum.

RELATED-ART DOCUMENT

Patent Documents

Patent Document 1: U.S. Pat. No. 8,145,328B2
Patent Document 2: US20150112639A1
Patent Document 3: U.S. Pat. No. 7,274,995B2
Patent Document 4: US20150032270A1

SUMMARY

One or more embodiments relate to a method for determining an amount of stiction in a control element of a plant operating according to a process control. The method includes configuring parameters for a target period of time for evaluation of the control element, collecting field data values of the control element, the field data values including a controller output and a manipulated variable of the control element, calculating a standard deviation of the target period of time for the difference between a position request and a position result, the position request and position result being respectively based on the controller output and the manipulated variable, calculating a standard deviation ratio between the standard deviation of the target period of time and a standard deviation of a reference period of time, and outputting an indication of excessive stiction based on the standard deviation ratio.

In some embodiments, the method includes calculating a correlation coefficient of the target period of time according to:

$$\text{Correlation Coefficient} = \frac{\sum_{i=1}^{n}(s_i - \bar{s})(r_i - \bar{r})}{\sqrt{\sum_{i=1}^{n}(s_i - \bar{s})^2}\sqrt{\sum_{i=1}^{n}(r_i - \bar{r})^2}}, \bar{s} = \frac{\sum_{i=1}^{n}s_i}{n}, \bar{r} = \frac{\sum_{i=1}^{n}r_i}{n}$$

where:
Correlation Coefficient: Correlation Coefficient;
$\bar{s}$: Average of Position Result
$\bar{r}$: Average of Position Request
$s_i$: Position Result
$r_i$: Position Request
n: Number of samples in the period.

According to one or more embodiments, the method includes calculating a correlation coefficient ratio of the correlation coefficient of the target period of time to a correlation coefficient of the reference period of time.

In exemplary embodiments, the method includes calculating a slope of an out pressure relative to the position result for the target period of time, and calculating a slope ratio of the slope of the target period of time to a slope of an out pressure relative to a position result for a reference period of time. The out pressure refers to a pressure at the output air of the valve.

Embodiments of the method may further comprise determining whether the standard deviation ratio exceeds a preset standard deviation ratio threshold.

In some embodiments, the method includes determining whether the correlation coefficient ratio exceeds a preset correlation coefficient ratio threshold.

According to one or more embodiments, the method includes automatically shutting down the control element if the standard deviation ratio and the correlation coefficient ratio respectively exceeds the preset standard deviation ratio threshold and the preset correlation coefficient ratio threshold.

One or more embodiments relate to a system comprising at least one controller for determining an amount of stiction in a control element of a plant operating according to a process control. The system includes at least one non-transitory computer readable medium operable to store program code and at least one processor operable to read said program code and operate as instructed by the program code. The program code includes configuring parameters for a target period of time for evaluation of the control element, collecting field data values of the control element, the field data values including a controller output and a manipulated variable of the control element, calculating a standard deviation of the target period of time for the difference between a position request and a position result, the position request and position result being respectively based on the controller output and the manipulated variable, calculating a standard deviation ratio between the standard deviation of the target period of time and a standard deviation of a reference period of time, and outputting an indication of excessive stiction based on the standard deviation ratio.

According to one or more embodiments, the program code includes calculating a correlation coefficient of the target period of time according to:

$$\text{Correlation Coefficient} = \frac{\sum_{i=1}^{n}(s_i - \bar{s})(r_i - \bar{r})}{\sqrt{\sum_{i=1}^{n}(s_i - \bar{s})^2}\sqrt{\sum_{i=1}^{n}(r_i - \bar{r})^2}}, \bar{s} = \frac{\sum_{i=1}^{n}s_i}{n}, \bar{r} = \frac{\sum_{i=1}^{n}r_i}{n}$$

where:
Correlation Coefficient: Correlation Coefficient;
$\bar{s}$: Average of Position Result
$\bar{r}$: Average of Position Request
$s_i$: Position Result
$r_i$: Position Request
n: Number of samples in the period.

In some embodiments, the program code includes calculating a correlation coefficient ratio of the correlation coefficient of the target period of time to a correlation coefficient of the reference period of time.

Embodiments of the system include that the program code includes calculating a slope of an out pressure relative to the position result for the target period of time, and calculating a slope ratio of the slope of the target period of time to a slope of an out pressure relative to a position result for a reference period of time.

According to one or more embodiments, the program code further includes determining whether the standard deviation ratio exceeds a preset standard deviation ratio threshold.

In exemplary embodiments, the program code further comprising determining whether the correlation coefficient ratio exceeds a preset correlation coefficient ratio threshold.

Embodiments of the system include that the program code includes automatically shutting down the control element if the standard deviation ratio and the correlation coefficient ratio respectively exceed the preset standard deviation ratio threshold and the preset correlation coefficient ratio threshold.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In the related art, methods to detect stiction in control elements involve using the process variable (PV) and the controller output (OP).

Exemplary embodiments of the present application consider the manipulated variable (MV) for diagnosis, or detection, of stiction of a control element, such as a valve. According to one or more embodiments, the manipulated variable (MV) is available from a sensor or smart transmitter through a fieldbus protocol.

Generally, during normal operation without stiction, the valve moves smoothly at a consistent speed given a consistent input. This means that for a consistent input to the valve, the valve should operate consistently. However, when there is stiction, or static friction that needs to be overcome to enable motion, the movement of the valve becomes inconsistent. The inconsistency in the movement of the valve is because there is initially no movement for an input to the valve due to the stiction, and then there is a sudden movement when additional force from the input overcomes the stiction. As a result, the movement of the valve cannot be accurately predicted, as the stiction prevents initial movement.

Embodiments of the present application provide for data collection regarding valve movement over a period of time in order to determine the effects of stiction on the valve. With data collection done over a period of time (target period which is predefined), it is possible to remove dependency on a high speed method of data collection.

According to embodiments of the present application, diagnosis of stiction, or degradation, of valves can be performed by evaluation of a deviation from a maximum permissible error. Each valve may differ in the maximum permissible error, since the maximum permissible error is dependent on a condition of process operation.

Evaluation may use a reference instead of absolute values for diagnosis by defining a reference period. The reference period is a period which the valve is functioning in an optimal state. With consideration of deviation, there is no need to manually determine a permissible error for each different process conditions. Accordingly, it is possible to monitor, diagnose, and detect early signs of stiction in control valves efficiently and safely.

As such, embodiments of the present application allow for a capable method of ensuring that plant assets, such as control valves are operating in optimum condition. Embodiments may provide information about the health/condition of control valves through Stiction Diagnostics.

Valve Stiction Diagnostics described in the present application is a diagnostic using statistical quality control (SQC), which uses statistical methods and formulae to monitor and ensure that control valves operate at their full potential. Such statistical quality control (SQC) can diagnose control valves from a ratio between calculated results of two time periods (calculation periods).

One calculation period is the Reference Period, which is a past time period, and the other calculation period is a Target Period. The Reference Period is ideally a time period where the valve is in optimum condition. As such, this period would have minimal stiction. The comparison Target Period is the current time period, or a desired time period. Beyond the current time period, it may be possible that a user may want to look up a past desired time period. The data from the desired time period may be historical data that is saved in a non-transitory storage memory. The non-transitory storage memory may be stored in any of the components of the process, not limited to the controller, the valve or final control element, the sensor, or a master system for the entire IA operation.

Embodiments of the Valve Stiction Diagnostics are configured to calculate key performance indicators (KPIs) based on a plurality of statistical quality control (SQC) calculations. A key performance indicator (KPI) is a type of performance measurement metric.

Figure 2:
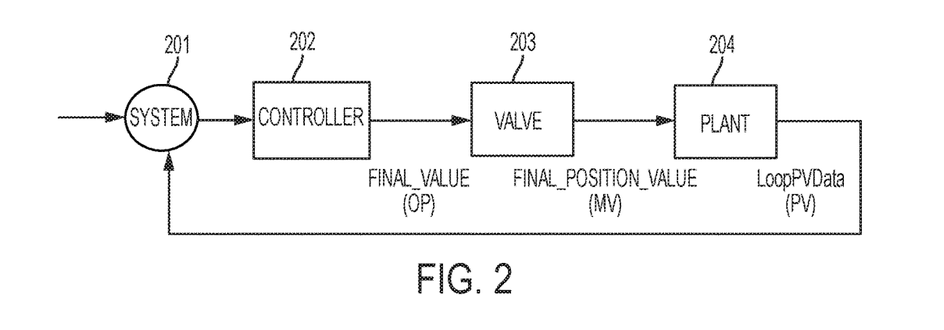
FIG. 2 illustrates an exemplary embodiment of a system and values of the system that are bases for calculation of key performance indicators.

In FIG. 2, values of the system (201) that are bases for calculation of the key performance indicators (KPIs) include a FINAL_VALUE from the controller output (OP) from the controller (202), a FINAL_POSITION_VALUE from the manipulated variable (MV) from the valve (203), and Loop-PVData from the process variable (PV) from the process (204).

Four key performance indicators (KPIs) that are used for the present Valve Stiction Diagnostics include a Standard Deviation of Target Period, a Standard Deviation Ratio, a Correlation Coefficient Ratio, and a Slope Ratio.

The Standard Deviation of Target Period is obtained by calculating a Standard Deviation of Deviation between a Position Request (adjusted FINAL_VALUE) and a Position Result (adjusted FINAL_POSITION_VALUE) in the Target Period. The difference between the Position Request and Position Result is a difference between the controller output (OP) and the manipulated value (MV).

The Standard Deviation Ratio is obtained by calculating the Ratio of Standard Deviations of the Target Period over the Reference Period. The Standard Deviation Ratio is to be used for determining the status of the valve in the Valve Stiction Diagnostics.

The Correlation Coefficient Ratio is a ratio of a Correlation Coefficient of the Target Period over the Reference Period. The Correlation Coefficient is calculated by using the Position Request and the Position Result. This may be a supplementary calculation that need not be used for determining the status of the valve in the Valve Stiction Diagnostics.

The Slope Ratio can also be understood as a Ratio of Inadequate Output Air. The Slope Ratio is the ratio between the slopes of regression lines of the Position Request and Out Pressure in both the Reference and Target Periods. This may be a supplementary calculation that need not be used for determining the status of the valve in the Valve Stiction Diagnostics, as not all valve types or models will have Out Pressure values.

Based on the key performance indicators (KPIs), the status, or stiction, of a target valve can be determined. In some embodiments, the data necessary for the key performance indicators are stored on the valve or control element, and can be requested by the system (201) or controller (202). As a result, embodiments of the present application can provide a status of a target valve, such as good, warning, or uncertain by comparing the Target Standard Deviation and Standard Deviation Ratio KPIs with configured threshold values.

Figure 3:
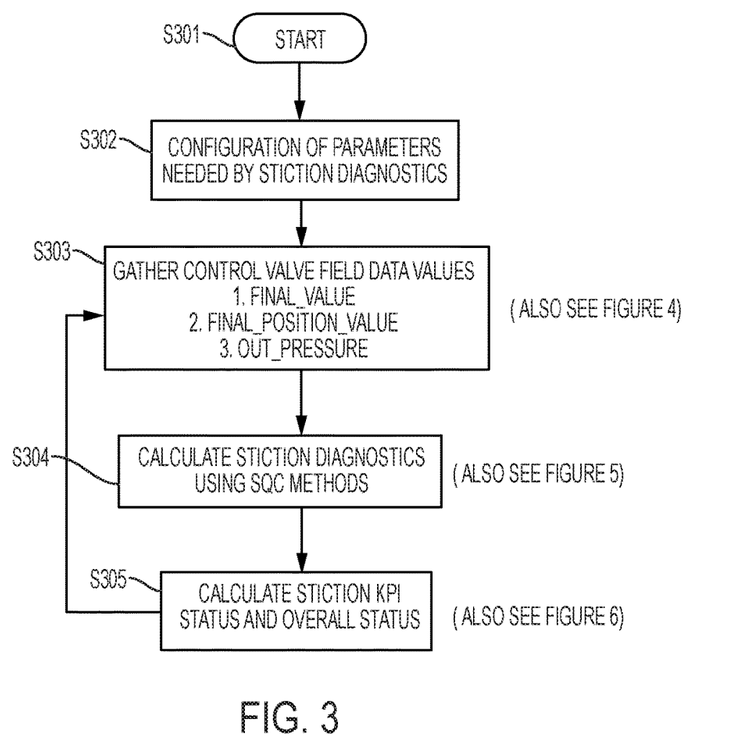
FIG. 3 illustrates an exemplary embodiment of a process of the present application.

FIG. 3 illustrates a process of an exemplary embodiment of the present application. Upon starting of a diagnostic run (S301), an initial configuration of parameters needed for stiction diagnostics is performed (S302). After configuration, control valve field data values can be collected (S303). These values may include FINAL_VALUE, FINAL_POSITION_VALUE, and OUT_PRESSURE. However, it is not necessary to collect every value, as OUT_PRESSURE may not be available on various types of valves. From the gathered values, calculations for the stiction diagnostics based on statistical quality control (SQC) methods can be done (S304). Then, stiction key performance indicators (KPIs) can be determined and the overall stiction status can be determined (S305). The stiction diagnostic can be run once or be programmed to run based on a schedule.

Configuration of Parameters

As part of the initial configuration of parameters in step S302, parameters such as those of TABLE 1 should be considered. These settings include selection of an Item Path to retrieve the necessary data values, as well as frequency of data gathering.

Some of these parameters may be selected as part of a user interface (UI), or they may be part of a database file stored in a storage unit. In some embodiments, the parameters may have a default setting, which can be further adjusted for customization. In some embodiments, the setting of the parameters may be exported as a database file for back up purposes or for setting up a similar IA operation.

TABLE 1

| Parameter | Description |
| --- | --- |
| FINAL_VALUE | Determine the OPC Data Item Path to retrieve the Final Value from a certain Control Valve Model. |
| FINAL_POSITION_VALUE | Determine the OPC Data Item Path to retrieve the Final Position Value from a certain Control Valve Model. |
| OUT_PRESSURE | Determine the OPC Data Item Path to retrieve the Out Pressure Value from a certain Control Valve Model. |
| Final Value Factor | The conversion factor for FINAL_VALUE to adjust it as Position Request. |
| Final Position Value Factor | The conversion factor for FINAL_POSITION_VALUE to adjust it as Position Result. |

TABLE 1-continued

| Parameter | Description |
| --- | --- |
| Collection Scan Rate | How frequent to Collect Control Valve Field Data Values. |
| Calculation Execution Rate | How frequent to Calculate Stiction Diagnostics. |
| Calculation Period in Days | Duration or Length of Reference and Target Periods. |
| Reference Period Start | This is the Start Date of the Reference Period. |
| Standard Deviation Ratio Factor | Factor to adjust StandardDeviationRatio as the final result. |
| Target Standard Deviation Ratio Factor | Factor to adjust TargetStandardDeviation as the final result. |
| Standard Deviation Ratio Threshold | If StandardDeviationRatio is less than StdDevRatioThreshold, the Status is Good/Green. |
| Target Standard Deviation Threshold | If Target Standard Deviation is less than TargetStdDevThreshold, the Status is Good/Green. |

Gathering Control Valve Field Data Values

Figure 4:
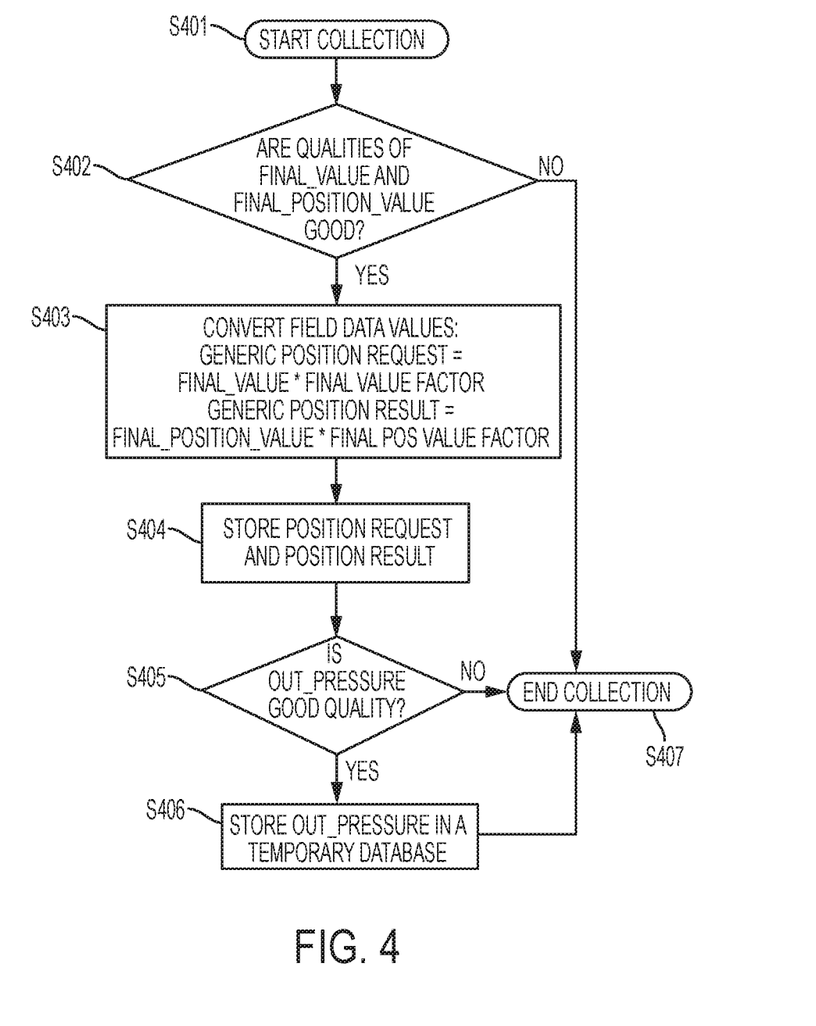
FIG. 4 illustrates a process of the exemplary embodiment for gathering control valve field data values.

FIG. 4 illustrates a process of an exemplary embodiment for gathering control valve field data values.

Field data collection periodically gathers values based on configured scan rate, which is set as a parameter during configuration. Also, as illustrated in the process of FIG. 3, it is periodically executed every scan rate.

To start collection of field data (S401), there is an initial determination of whether the field data values are of good quality (S402). If the field data values are determined to be of a bad quality, the diagnostics will end collection of data.

Additionally, if the values are not of good quality, the proceeding to ending collection (S407) may also trigger an alarm or warning to the user to notify the user of problems with data collection from the target valve. Determination of the quality of the field data values can be done by several methods, including boundary limits on acceptable field data values. Alternatively, there may be considerations of granularity or the fineness of the field data values. If the field data values are of insufficient fineness, it may be pointless to attempt stiction diagnostics analysis.

If the field data values are good, then the field data values can be converted (S403). Through set equations, the field data values can be converted into values for Position Request and Position Result. The FINAL_VALUE and FINAL_POSITION_VALUE can be converted to Position Request and Result, respectively. This is to standardize the values, to support different control valve models. Formulas for the conversion of the field data values are:

$$\text{Position Request} = \text{FINAL\_VALUE} * \text{Final Value Factor} \quad \text{equation (1)}$$

$$\text{Position Result} = \text{FINAL\_POSITION\_VALUE} * \text{Final Position Value Factor} \quad \text{equation (2)}$$

Alternatively, in some embodiments, instead of collecting field data values, a data set of field data values may be used.

The Position Request and Position Result are then stored in a storage unit (S404).

After the storage of the Position Request and Position Result, a determination can be made as to whether OUT_PRESSURE data is of good quality (S405). This step may be avoided if the valve does not have OUT_PRESSURE data. If the OUT_PRESSURE data is of good quality, the OUT_PRESSURE may be stored (S406). This may be in the storage unit for the Position Request and Position Result, or it may be a different storage unit.

Again, if the values for OUT_PRESSURE are not of good quality, the proceeding to ending collection (S407) may also trigger an alarm or warning to the user to notify the user of problems with data collection from the target valve.

Calculations for Stiction Diagnostics

Figure 5:
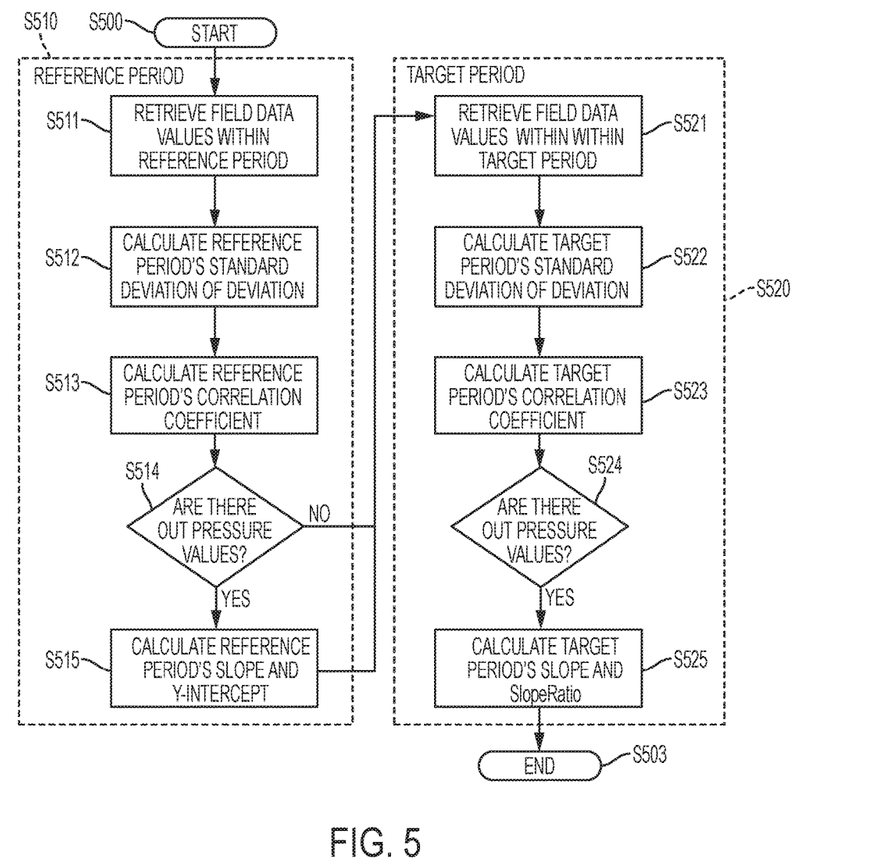
FIG. 5 illustrates a process of the exemplary embodiment for calculating key performance indicators for determining stiction diagnostics.

FIG. 5 illustrates a process (S500-S503) for calculating key performance indicators (KPIs) for determining stiction diagnostics. Calculations relating to the Reference Period (S510) are performed before calculations for the Target Period (S520) are performed. The processes for the Reference Period include steps S511 to S515. The processes for the Target Period include steps S521 to S525, before ending S503. Calculations may occur periodically based on Calculation Execution Rate, which is typically set once a day.

First, the field data values within the Reference Period are retrieved (S511).

Second, the Reference Period's Standard Deviation of Deviation is calculated (S512). To compute the Standard Deviation of Deviation, the Reference Period's field data values are applied to the Unbiased Standard Deviation formula below:

$$(r_i - s_i) = \sqrt{\frac{\sum_{i=1}^{n} \{(r_i - s_i) - \overline{r-s}\}^2}{n-1}}, \overline{r-s} = \frac{\sum_{i=1}^{n}(r_i - s_i)}{n} \quad \text{equation (3)}$$

Where:
$(r_i - s_i)$: Standard Deviation of Deviation
$\overline{r-s}$: Average of Deviation
$s_i$: Position Request
$r_i$: Position Result
n: Count of Field Data Values in the period.

Third, the Reference Period's Correlation Coefficient is calculated (S513). To compute the Correlation Coefficient, the collected field Data Values within the period are applied to the formula of Correlation Coefficient below:

$$\text{Correlation Coefficient} = \frac{\sum_{i=1}^{n}(s_i - \bar{s})(r_i - \bar{r})}{\sqrt{\sum_{i=1}^{n}(s_i - \bar{s})^2}\sqrt{\sum_{i=1}^{n}(r_i - \bar{r})^2}}, \bar{s} = \frac{\sum_{i=1}^{n} s_i}{n}, \bar{r} = \frac{\sum_{i=1}^{n} r_i}{n} \quad \text{equation (4)}$$

where:
Correlation Coefficient: Correlation Coefficient;
$\bar{s}$: Average of Position Result
$\bar{r}$: Average of Position Request
$s_i$: Position Result
$r_i$: Position Request
n: Number of samples in the period.

Fourth, a determination is made as to whether there are OUT_PRESSURE values (S514). If there no OUT_PRESSURE values, evaluation moves to the Target Period processes of S520. If there are valid OUT_PRESSURE field data values, a Slope Ratio is calculated.

Fifth, the Reference Period's Slope and Y-Intercept can be calculated (S515). The Slope of a regression line provides a relationship between the Position Request and the OUT_PRESSURE. For the Reference Period, the Slope (aref) and Y-Intercept (bref) are estimated using the Least Square Method in the scatter graph between Position Result (ri) on the horizontal axis, and Out Pressure (pi) on the vertical axis. The relationships can be found with the following formulas:

$$a_{ref} = \frac{\sum_{i=1}^{n} r_i p_i - \sum_{i=1}^{n} r_i \sum_{i=1}^{n} p_i}{n\sum_{i=1}^{n} r_i^2 - \left(\sum_{i=1}^{n} r_i\right)^2} \quad \text{equation (5)}$$

$$b_{ref} = \frac{\sum_{i=1}^{n} r_i^2 \sum_{i=1}^{n} p_i - \sum_{i=1}^{n} r_i p_i \sum_{i=1}^{n} r_i}{n\sum_{i=1}^{n} r_i^2 - \left(\sum_{i=1}^{n} r_i\right)^2} \quad \text{equation (6)}$$

Where:
$a_{ref}$: Reference Period Slope
$b_{ref}$: Y-Intercept
$r_i$: Position Result
$p_i$: Out Pressure
n: Number of value pairs from reference period.

Next, in the sixth step, the field data values within the Target Period are retrieved (S521). These field data values will be used for the Target Period calculations.

Seventh, the Target Period's Standard Deviation of Deviation is calculated (S522). This is done with the field data values within the Target Period and using the same Unbiased Standard Deviation formula in equation (3).

Eighth, the Target Period's Correlation Coefficient is calculated (S523). This is done with the field data values within the Target Period and using the same Correlation Coefficient formula in equation (4).

Ninth, a determination is made as to whether there are OUT_PRESSURE values (S524). If there are valid OUT_PRESSURE field data values, a Slope Ratio is calculated.

Tenth, the Target Period's Slope and Y-Intercept can be calculated (S525). The Target Period Slope (a) is calculated using the formula below:

$$y = ax + b, a = \frac{\sum_{i=1}^{n} r_i p_i - b_{ref} \sum_{i=1}^{n} r_i}{\sum_{i=1}^{n} r_i^2}, b = b_{ref} \quad \text{equation (7)}$$

Where:
$r_i$: Position Result from target period
$p_i$: Out Pressure from target period
n: Number of Field Data Value Pairs from target period
b or $b_{ref}$: Y-Intercept which was computed in Step 5.

The Slope Ratio, which is the ratio of slopes of the Target Period over the Reference Period, is described in the formula below:

$$SlopeRatio = \frac{a}{a_{ref}} \qquad \text{equation (8)}$$

Where:

$a_{ref}$: Reference Period Slope, computed in Step 5.

a: Target Period Slope

Alternatively, instead of computing for the Reference Period calculations, these values could be preset or configured as part of the parameters setting in S302.

Calculations for Stiction and Overall Status

Figure 6:
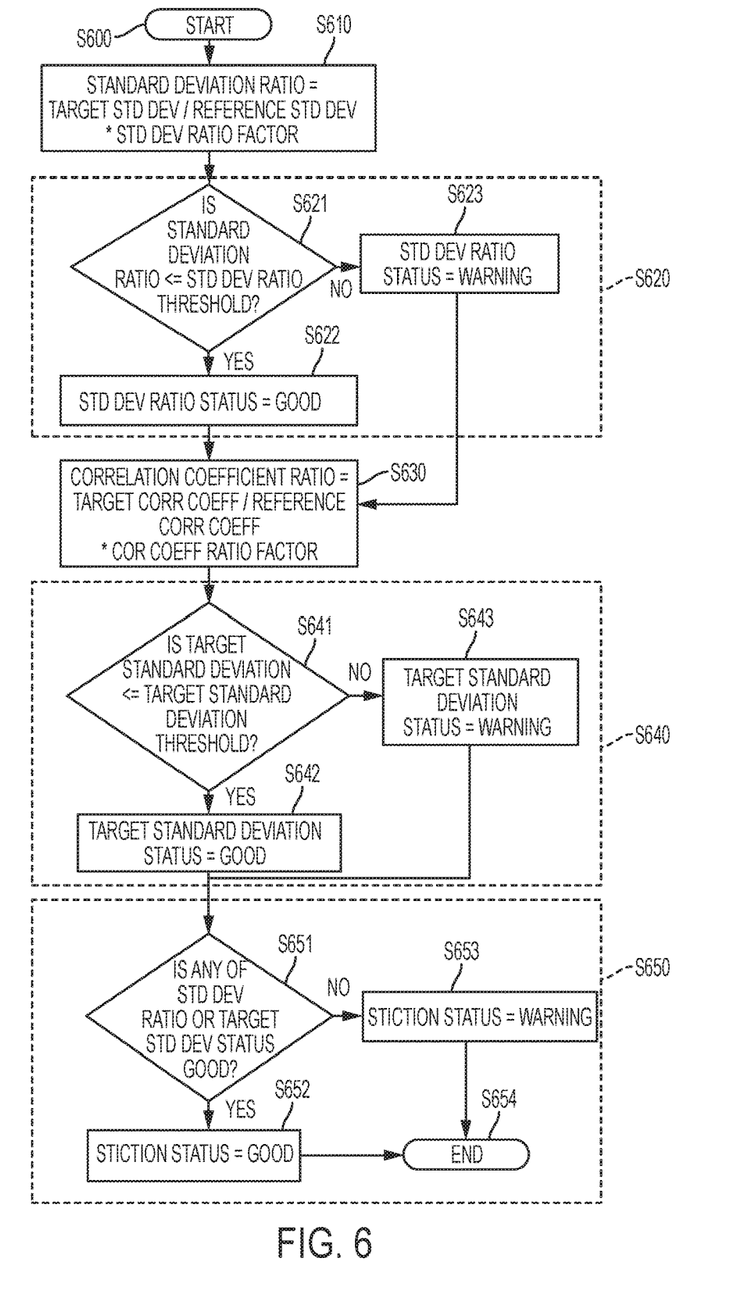
FIG. 6 illustrates a process of the exemplary embodiment for calculating three of the stiction key performance indicators as well as the overall status of the control valve.

FIG. 6 illustrates a process (S600-S654) for calculating three of the stiction key performance indicators as well as the overall status of the control valve.

The Standard Deviation Ratio (S610) can be calculated from the Ratio of Standard Deviations of Deviation between the Reference Period (S512) and the Target Period (S522) based on the formula below:

$$StandardDeviationRatio = \frac{(r_i - s_i)_{target}}{(r_i - s_i)_{ref}}$$

Where:

$(r_i-s_i)_{ref}$: Standard Deviation of Deviation of Reference Period (from S512)

$(r_i-s_i)_{target}$: Standard Deviation of Deviation of Target Period (from S522).

From this, a decision based on the Standard Deviation Ratio (S620) can be made regarding the valve status. If the computed Standard Deviation Ratio is less than or equal to the configured Standard Deviation Ratio Threshold (from S302) (S621), then its Status is set to Good (S622). If it is greater than the configured Threshold, then the status is set to Warning (S623).

Next, a Correlation Coefficient Ratio is calculated (S630) as a Ratio of Correlation Coefficients between the Reference Period (S513) and the Target Period (S523) based on the formula below:

$$CorrelationCoefficientRatio = \frac{Correlation\ Coefficient_{target}}{Correlation\ Coefficient_{ref}}$$

Where:

CorrelationCoefficient$_{target}$: Correlation Coefficient of Target Period (from S523)

CorrelationCoefficient$_{ref}$: Correlation Coefficient of Reference Period (from S513).

From this, a decision based on the Correlation Coefficient Ratio (S640) can be made regarding the valve status. If the computed Correlation Coefficient Ratio is less than or equal to the configured Correlation Coefficient Ratio Threshold (from S302) (S641), then its Status is set to Good (S642). If it is greater than the configured Threshold, then the status is set to Warning (S643).

Following the decisions for the Standard Deviation Ratio and Correlation Coefficient Ratio, a decision on overall status (S650) can be made regarding the valve status. If any of the Standard Deviation Ratio and Target Standard Deviation status is Good (S651), the Stiction Overall Status is set to Good (S652). Otherwise, the Overall Stiction Status is set to Warning (S653).

Alternatively, in some embodiments, if any of the Standard Deviation Ratio and Target Standard Deviation status is set to Warning, then the Overall Stiction Status is set to Warning.

In reoccurring diagnostics, the processes of S303 to S305 in FIG. 3 can be repeated.

In addition to the Good or Warning, some embodiments may provide for an Uncertain setting. When there is not enough Field Data Values (i.e. only 1 good field data value) in any period (Reference or Target period), the Stiction Status can be set to Uncertain. Also, if the Reference Period's Standard Deviation is zero, then the Standard Deviation Ratio Status is set to Uncertain. If both Standard Deviation Ratio and Target Standard Deviation Status are Uncertain, then the Stiction Overall Status is set to Uncertain.

In some embodiments, if a valve in a particular process is set as Warning or Uncertain, the system or IA operation can reroute a process to another controller, final control element, and process that have been identified as being Good. In some embodiments, the system or IA operation may automatically deactivate or shut down the final control element of the combination of controller, final control element, and process upon the determination of Warning or Uncertain.

Figure 7:
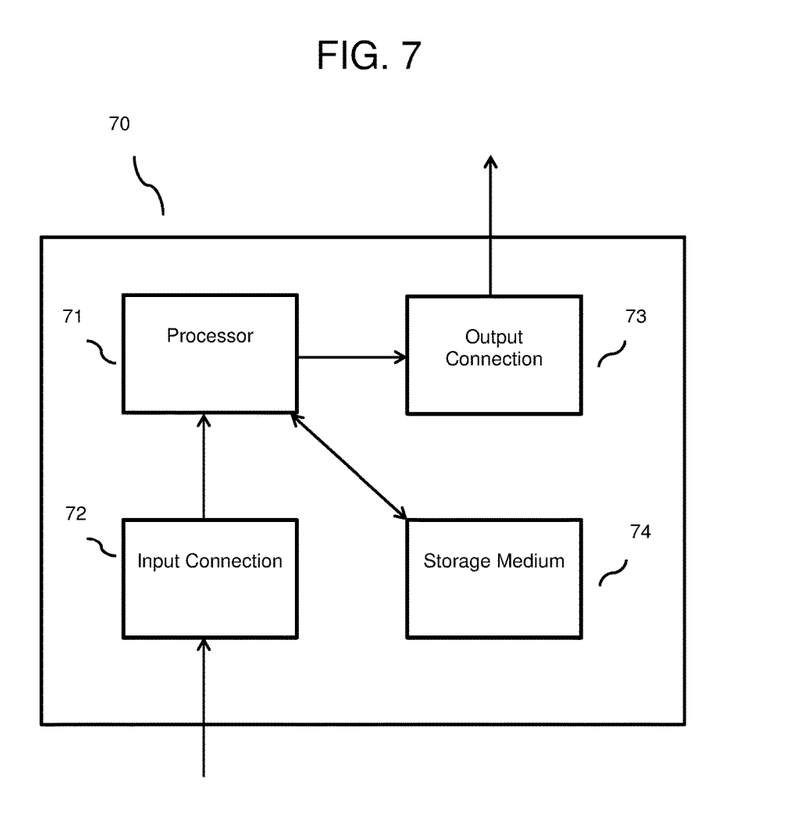
FIG. 7 illustrates shows an exemplary device, or controller, that may achieve the process of monitoring stiction.

FIG. 7 shows an exemplary device, or controller, (70) that may achieve the process having a processor (71), an input connection (72) an output connection (73), and a storage medium (74).

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Although the drawings describe the user interface (UI) views in a specific order or layout, one should not interpret that the UI views are performed in a specific order or layout as shown in the drawings or successively performed in a continuous order, or that all the UI views are necessary to obtain a desired result. Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

The invention claimed is:

1. A method for determining an amount of stiction in a control element of a plant operating according to a process control, the method comprising:
   configuring parameters for a target period of time for evaluation of the control element;
   collecting, by at least one processor, field data values of the control element, the field data values including a controller output and a manipulated variable of the control element;
   calculating, by the at least one processor, a standard deviation of the target period of time for the difference between a position request and a position result, the position request and position result being respectively based on the controller output and the manipulated variable;
   calculating, by the at least one processor, a standard deviation ratio between the standard deviation of the target period of time and a standard deviation of a reference period of time; and
   outputting, by the at least one processor, an indication of excessive stiction based on the standard deviation ratio.

2. The method according to claim 1, further comprising:
   calculating a correlation coefficient of the target period of time according to:

$$\text{Correlation Coefficient} = \frac{\sum_{i=1}^{n}(s_i - \bar{s})(r_i - \bar{r})}{\sqrt{\sum_{i=1}^{n}(s_i - \bar{s})^2} \sqrt{\sum_{i=1}^{n}(r_i - \bar{r})^2}}, \bar{s} = \frac{\sum_{i=1}^{n} s_i}{n}, \bar{r} = \frac{\sum_{i=1}^{n} r_i}{n}$$

where:
Correlation Coefficient: Correlation Coefficient;
$\bar{s}$: Average of Position Result
$\bar{r}$: Average of Position Request
$s_i$: Position Result
$r_i$: Position Request
n: Number of samples in the period $$\text{Correlation Coefficient} = \frac{\sum_{i=1}^{n}(s_i - \bar{s})(\eta - \bar{r})}{\sqrt{\sum_{i=1}^{n}(s_i - \bar{s})^2} \sqrt{\sum_{i=1}^{n}(\eta - \bar{r})^2}},$$

$$\bar{s} = \frac{\sum_{i=1}^{n} s_i}{n}, \bar{r} = \frac{\sum_{i=1}^{n} \eta}{n}$$

Correlation Coefficient.

3. The method according to claim 2, further comprising:
   calculating a correlation coefficient ratio of the correlation coefficient of the target period of time to a correlation coefficient of the reference period of time.

4. The method according to claim 1, further comprising:
   calculating a slope of an out pressure relative to the position result for the target period of time; and
   calculating a slope ratio of the slope of the target period of time to a slope of an out pressure relative to a position result for a reference period of time.

5. The method according to claim 1, further comprising:
   determining whether the standard deviation ratio exceeds a preset standard deviation ratio threshold.

6. The method according to claim 5, further comprising determining whether the correlation coefficient ratio exceeds a preset correlation coefficient ratio threshold.

7. The method according to claim 1, further comprising:
   automatically shutting down the control element if the standard deviation ratio and the correlation coefficient ratio respectively exceed the preset standard deviation ratio threshold and the preset correlation coefficient ratio threshold.

8. A system comprising at least one controller for determining an amount of stiction in a control element of a plant operating according to a process control, the system comprising:
   at least one non-transitory computer readable medium operable to store program code;
   at least one processor operable to read said program code and operate as instructed by the program code, the program code comprising:
      configuring parameters for a target period of time for evaluation of the control element;
      collecting field data values of the control element, the field data values including a controller output and a manipulated variable of the control element;
      calculating a standard deviation of the target period of time for the difference between a position request and a position result, the position request and position result being respectively based on the controller output and the manipulated variable;
      calculating a standard deviation ratio between the standard deviation of the target period of time and a standard deviation of a reference period of time; and
      outputting an indication of excessive stiction based on the standard deviation ratio.

9. The system according to claim 8, the program code further comprising:
   calculating a correlation coefficient of the target period of time according to:

$$\text{Correlation Coefficient} = \frac{\sum_{i=1}^{n}(s_i - \bar{s})(r_i - \bar{r})}{\sqrt{\sum_{i=1}^{n}(s_i - \bar{s})^2} \sqrt{\sum_{i=1}^{n}(r_i - \bar{r})^2}}, \bar{s} = \frac{\sum_{i=1}^{n} s_i}{n}, \bar{r} = \frac{\sum_{i=1}^{n} r_i}{n}$$

where:
Correlation Coefficient: Correlation Coefficient;
$\bar{s}$: Average of Position Result
$\bar{r}$: Average of Position Request
$s_i$: Position Result
$r_i$: Position Request
n: Number of samples in the period $$\text{Correlation Coefficient} = \frac{\sum_{i=1}^{n}(s_i - \bar{s})(\eta - \bar{r})}{\sqrt{\sum_{i=1}^{n}(s_i - \bar{s})^2}\sqrt{\sum_{i=1}^{n}(\eta - \bar{r})^2}},$$

$$\bar{s} = \frac{\sum_{i=1}^{n} s_i}{n}, \bar{r} = \frac{\sum_{i=1}^{n} \eta}{n}$$

Correlation Coefficient.

10. The system according to claim 9, the program code further comprising:

calculating a correlation coefficient ratio of the correlation coefficient of the target period of time to a correlation coefficient of the reference period of time.

11. The system according to claim 8, the program code further comprising:

calculating a slope of an out pressure relative to the position result for the target period of time; and calculating a slope ratio of the slope of the target period of time to a slope of an out pressure relative to a position result for a reference period of time.

12. The system according to claim 8, the program code further comprising determining whether the standard deviation ratio exceeds a preset standard deviation ratio threshold.

13. The system according to claim 12, the program code further comprising determining whether the correlation coefficient ratio exceeds a preset correlation coefficient ratio threshold.

14. The system according to claim 8, the program code further comprising:

automatically shutting down the control element if the standard deviation ratio and the correlation coefficient ratio respectively exceeds the preset standard deviation ratio threshold and the preset correlation coefficient ratio threshold.

* * * * *